(12) United States Patent
Sugiura et al.

(10) Patent No.: US 10,540,695 B2
(45) Date of Patent: Jan. 21, 2020

(54) INFORMATION PROVIDING DEVICE, INFORMATION PROVIDING METHOD, INFORMATION PROVIDING PROGRAM, AND RECORDING MEDIUM HAVING INFORMATION PROVIDING PROGRAM RECORDED THEREON

(75) Inventors: Kenji Sugiura, Shinagawa-ku (JP); Yasuaki Shirogane, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/807,654

(22) PCT Filed: Jun. 28, 2011

(86) PCT No.: PCT/JP2011/064733
§ 371 (c)(1),
(2), (4) Date: Dec. 28, 2012

(87) PCT Pub. No.: WO2012/002350
PCT Pub. Date: Jan. 5, 2012

(65) Prior Publication Data
US 2013/0110649 A1    May 2, 2013

(30) Foreign Application Priority Data
Jun. 29, 2010 (JP) .................................. 2010-147722

(51) Int. Cl.
*G06Q 30/02* (2012.01)

(52) U.S. Cl.
CPC ................................ *G06Q 30/0277* (2013.01)

(58) Field of Classification Search
None
See application file for complete search history.

(56) References Cited

U.S. PATENT DOCUMENTS 6,279,112 B1 * 8/2001 O'Toole et al. ................ 726/10
2002/0120589 A1  8/2002 Aoki
(Continued)

FOREIGN PATENT DOCUMENTS

CN       101689268 A       3/2010
JP       2001229168 A      8/2001
(Continued)

OTHER PUBLICATIONS

Optimal Scheduling and Placement of Internet Banner Advertisements; IEEE Transactions on Knowledge and Data Engineering, vol. 19, No. 11, Nov. 2007; Subodha Kumar, Milind Dawande, and Vijay S. Mookerjee.*

(Continued)

*Primary Examiner* — Victoria E Frunzi
(74) *Attorney, Agent, or Firm* — Sughrue Mion, PLLC

(57) ABSTRACT

There is provided an information providing device which, even when one advertisement display area is shared between a plurality of advertisers, can increase the probability that, for example, a banner advertisement of each advertiser is specified and efficiently display information matching each advertiser. The information providing device is configured to, when a user of a terminal device specifies an advertisement display area, specify a partial area including a position specified in the advertisement display area, and transmit information matching a provider allocated to the partial area to the terminal device.

10 Claims, 7 Drawing Sheets

(56) References Cited

U.S. PATENT DOCUMENTS

| | | | | |
|---|---|---|---|---|
| 2005/0160002 | A1* | 7/2005 | Roetter | G06Q 30/02 |
| | | | | 705/14.42 |
| 2005/0203797 | A1* | 9/2005 | Isobe | G06Q 30/0231 |
| | | | | 705/14.31 |
| 2007/0150347 | A1* | 6/2007 | Bhamidipati et al. | 705/14 |
| 2008/0154684 | A1* | 6/2008 | Kniaz | G06Q 30/02 |
| | | | | 705/7.29 |
| 2008/0263143 | A1 | 10/2008 | Takahashi et al. | |
| 2009/0265243 | A1* | 10/2009 | Karassner | G06Q 30/02 |
| | | | | 705/14.54 |
| 2009/0282349 | A1* | 11/2009 | Olsen | G06F 9/4443 |
| | | | | 715/760 |
| 2009/0307095 | A1 | 12/2009 | Chatani et al. | |
| 2010/0094703 | A1* | 4/2010 | Bramley | G06Q 30/02 |
| | | | | 705/14.45 |
| 2010/0161417 | A1 | 6/2010 | Mitsui et al. | |
| 2011/0307826 | A1* | 12/2011 | Rivera | G06Q 30/0603 |
| | | | | 715/784 |
| 2012/0005022 | A1* | 1/2012 | Lee | 705/14.54 |

FOREIGN PATENT DOCUMENTS

| | | | | |
|---|---|---|---|---|
| JP | 2002-56289 | | 2/2002 | |
| JP | 2002-092488 | A | 3/2002 | |
| JP | 2002-109357 | A | 4/2002 | |
| JP | 2002-245329 | | 8/2002 | |
| JP | 2002-253847 | A | 9/2002 | |
| JP | 2002-304142 | A | 10/2002 | |
| JP | 2002-334267 | | 11/2002 | |
| JP | 2008-077173 | A | 4/2008 | |
| JP | 2008-217163 | | 9/2008 | |
| JP | 2008-287443 | A | 11/2008 | |
| JP | 2009-53219 | | 3/2009 | |
| JP | 2010-073172 | A | 4/2010 | |
| KR | 102009001423 | A | 1/2009 | |
| WO | WO 01/75781 | | * 10/2001 | G06K 11/18 |

OTHER PUBLICATIONS

Japanese Office Action dated Feb. 19, 2013 in corresponding Japanese Patent Application No. 2010-147722.

"From England, an epoch-making pixel advertisement site . . . ", Feb. 21, 2006, ValuePress!, [retrieved on Feb. 12, 2013], Internet ,URL:http://www.value-press.com/pressrelease/4903>.

"Using HTML ISMAP" https://web.archive.org/web/20100129090248/http://www.tutorialspoint.com/html/using_html_ismap.htm. Retrieved Mar. 15, 2016. p. 1 (1 page total).

"HTML Image Links" https://web.archive.org/web/20100123150514/http://www.tutorialspoint.com/html/html_image_links.htm. Retrieved Mar. 15, 2016. p. 1-2 (2 pages total).

European Communication dated Oct. 31, 2019, issued in counterpart European Application No. 11 800 814.3.

* cited by examiner

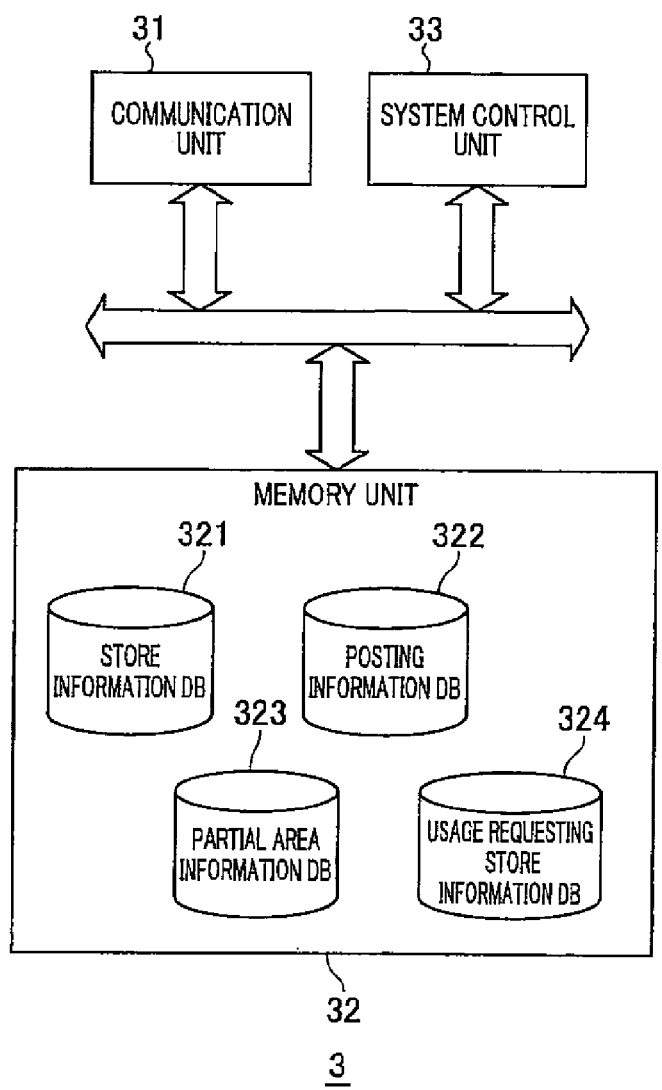

FIG.4

| PRODUCT (PRODUCT ID) | POSTED DATE | POSTING INFORMATION | | | URL OF POSTING INFORMATION ACQUISITION DESTINATION SITE |
|---|---|---|---|---|---|
| S00001 | 2010/5/10 15:00 | REVIEW | EVALUATION: 3 | NUMBER OF VIEWS: 70 | http://review.abc.co.jp/1111/p1/ |
| | 2010/5/10 15:02 | TWEET | PRICE IS HIGH. A FEW FUNCTIONS ARE AVAILABLE. .... | NUMBER OF VIEWS: 7900 | NUMBER OF FOLLOWERS: 60 | http://tsubuyaki.abc.co.jp/aoki002/ |
| | 2010/5/10 15:03 | REVIEW | DESIGN AND OPERABILITY ARE VERY GOOD, AND VERY SATISFYING. | NUMBER OF VIEWS: 70 | http://shopping.abc.co.jp/shop-22222/ |
| | 2010/5/10 15:03 | ARTICLE | THIS IS RECOMMENDABLE CAMERA. .... | NUMBER OF VIEWS: 800 | NUMBER OF IN-BOUND LINKS: 80 | http://blog.abc.co.jp/higuchi001/ |
| | .... | .... | .... | | |
| | .... | .... | .... | | |
| S00002 | 2010/5/10 15:01 | REVIEW | EVALUATION: 1. .... | NUMBER OF VIEWS: 70 | http://review.abc.co.jp/1112/p1/ |
| | 2010/5/10 15:03 | WORD OF MOUTH | DESIGN IS NOT SO GOOD. | NUMBER OF VIEWS: 70 | http://shopping.abc.co.jp/shop-33333/ |
| | 2010/5/10 15:05 | ARTICLE | THIS IS RECOMMENDABLE VIDEO CAMERA. .... | NUMBER OF VIEWS: 800 | NUMBER OF IN-BOUND TRACKBACKS: 5 | http://blog.abc.co.jp/higuchi001/ |
| | .... | .... | .... | | |
| | .... | .... | .... | | |
| S00003 | 2010/5/10 15:04 | .... | .... | | http://blog.abc.co.jp/higuchi001/ |
| | .... | .... | .... | | |
| | .... | .... | .... | | |
| .... | | | | | |

FIG.7

EXAMPLE OF TABLE FOR CONVERTING SCORE CALCULATION ELEMENT INTO CONVERSION POINT

| NUMBER OF POSTS | 1 TO 1000 HITS: 10p |
| --- | --- |
| | 1001 TO 2000 HITS: 20p |
| | THEREAFTER ADD 10 p FOR EVERY 1000 HIT |
| NUMBER OF VIEWS | 1 TO 500 HITS: 10p |
| | 501 TO 1000 HITS: 20p |
| | THEREAFTER ADD 10 p FOR EVERY 500 HIT |
| NUMBER OF REPLIES | 1 TO 100 HITS: 10p |
| | 101 TO 200 HITS: 20p |
| | THEREAFTER ADD 10 p FOR EVERY 100 HIT |
| NUMBER OF FOLLOWERS | 1 TO 50 HITS: 10p |
| | 51 TO 100 HITS: 20p |
| | THEREAFTER ADD 10 p FOR EVERY 50 HIT |
| NUMBER OF IN-BOUND LINKS | 1 TO 20 HITS: 10p |
| | 21 TO 40 HITS: 20 |
| | THEREAFTER ADD 10 p FOR EVERY 20 HIT |
| . . . | . . . |
| | . . . |

FIG.8

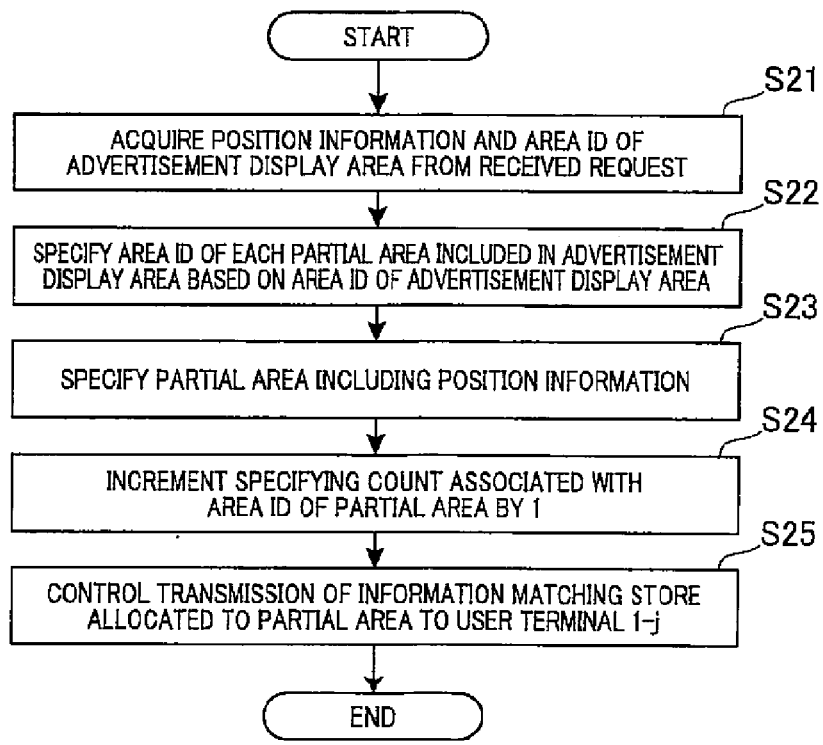

INFORMATION PROVIDING DEVICE, INFORMATION PROVIDING METHOD, INFORMATION PROVIDING PROGRAM, AND RECORDING MEDIUM HAVING INFORMATION PROVIDING PROGRAM RECORDED THEREON

TECHNICAL FIELD

The present invention relates to a technical field of, for example, an information providing device which provides a webpage including an advertisement display area to a terminal device through a network.

BACKGROUND ART

Conventionally, a commercial transaction system is known which connects to a network such as Internet using a terminal device such as a personal computer, and which enables commercial transaction such as purchase of a product or reservation to use service through, for example, a webpage provided by, for example, a web server. Such a commercial transaction system displays (lists) a so-called banner advertisement on, for example, a predetermined webpage. For example, sellers of products can lead viewers to webpages for selling the products of the sellers by way of links established in banner advertisements.

Meanwhile, a banner advertisement displayed in, for example, a popular webpage has a high advertising effect, and therefore there is a lot of advertisers who desire to display banner advertisements on such webpages. However, an advertisement display area for displaying a banner advertisement on a webpage is limited, and therefore the number of advertisers who can use the advertisement display area is also limited.

Meanwhile, in recent years, a technique is known which switches a banner advertisement to be displayed in a single advertisement display area on a given webpage per predetermined time. Such a technique can display banner advertisements matching a greater number of advertisers in one advertisement display area. Further, Patent Literature 1 discloses a technique which is capable of automatically changing advertisement content which has already been listed only by transmitting advertisement data from a client terminal to a management server.

CITATION LIST

Patent Literature

Patent Literature 1: Japanese Patent Application Laid-Open No. 2002-109357

SUMMARY OF THE INVENTION

Problem to be Solved by the Invention

However, when each banner advertisement of each seller (advertiser) who shares one advertisement display area is switched per predetermined time, an exposure time (display time) of each banner advertisement is restricted, and a chance that viewers recognize the banner advertisement decreases. Hence, there is a problem that there is a banner advertisement for which a link is not specified (for example, which is not clicked) by a viewer.

The present invention is made in light of, for example, the above, and an object of the present invention is to provide an information providing device, an information providing method, an information providing program and a recording medium having the information providing program recorded thereon which, even when one advertisement display area is shared among a plurality of advertisers, can increase the probability that, for example, a banner advertisement of each advertiser is specified and efficiently display information matching each advertiser.

Means for Solving the Problem

In order to solve the above problem, the invention according to claim 1 is an information providing device that provides display data including an advertisement display area to a terminal device through a network,
the information providing device comprising:
a partial area information memory means that associates and stores partial area specifying information for specifying a partial area included in the advertisement display area, and provider specifying information for specifying a provider who provides a commercial transaction target, per partial area;
a transmitting means that transmits the display data including the advertisement display area to the terminal device;
a position information acquiring means that acquires position information specified in the advertisement display area, from the terminal device;
a partial area specifying means that specifies the partial area including the acquired position information; and
a control means that specifies the provider based on partial area specifying information matching the partial area specified by the partial area specifying means, and controls transmission of information matching the specified provider, to the terminal device.

The present invention is configured to specify a partial area including a position specified in an advertisement display area of a terminal device, specify a provider based on partial area specifying information matching the partial area and transmit information matching the specified provider, to the terminal device, so that, even when one advertisement display area is shared between a plurality of providers (advertisers), it is possible to increase the probability that the partial area allocated to each provider is specified and efficiently display information matching each provider.

The invention according to claim 2 is the information providing device according to claim 1,
further comprising an area allocating means that allocates the partial area per provider based on a usage fee for utilizing the advertisement display area.

The present invention can allocate the partial area matching the usage fee paid by the provider, to the provider.

The invention according to claim 3 is the information providing device according to claim 2,
further comprising a specifying count memory means that stores a specifying count of the partial area per partial area,
wherein the area allocating means compares specifying counts of the respective partial areas stored in the specifying count memory means, and allocates the provider of a relatively high bid of the usage fee to a partial area of a relatively high specifying count.

The present invention can allow a greater number of viewers view information matching a provider of a higher bid of the usage fee.

The invention according to claim 4 is the information providing device according to any one of claims 1 to 3, further comprising an allocation changing means that changes a provider allocated to the partial area based on a predetermined condition.

The present invention can adequately change the provider who has already been allocated to the partial area, according to a change in a subsequent situation.

The invention according to claim 5 is the information providing device according to claim 4, further comprising a specifying count memory means that stores a specifying count of the partial area per partial area, wherein the allocation changing means changes a provider allocated to a partial area whose specifying count exceeds a threshold.

The present invention can facilitate display of information matching the provider allocated to a partial area other than a partial area which exceeds a threshold.

The invention according to claim 6 is an information providing method executed by a computer that provides display data including an advertisement display area, to a terminal device through a network, the information providing method comprising:

a step of associating and storing partial area specifying information for specifying a partial area included in the advertisement display area, and provider specifying information for specifying a provider who provides a commercial transaction target, per partial area;

a step of transmitting the display data including the advertisement display area to the terminal device;

a step of acquiring position information specified in the advertisement display area, from the terminal device;

a step of specifying the partial area including the acquired position information; and a step of controlling to specify the provider based on partial area specifying information matching the partial area specified by the partial area specifying means, and control transmission of information matching the specified provider, to the terminal device.

The invention according to claim 7 is an information providing program causing a computer that provides display data including an advertisement display area, to a terminal device through a network, to function as:

a partial area information memory means that associates and stores partial area specifying information for specifying a partial area included in the advertisement display area, and provider specifying information for specifying a provider who provides a commercial transaction target, per partial area;

a transmitting means that transmits the display data including the advertisement display area to the terminal device;

a position information acquiring means that acquires position information specified in the advertisement display area, from the terminal device;

a partial area specifying means that specifies the partial area including the acquired position information; and a control means that specifies the provider based on partial area specifying information matching the partial area specified by the partial area specifying means, and controls transmission of information matching the specified provider, to the terminal device.

The invention according to claim 8 is a recording medium having an information providing program recorded thereon that causes a computer that provides display data including an advertisement display area, to a terminal device through a network, to function as:

a partial area information memory means that associates and stores partial area specifying information for specifying a partial area included in the advertisement display area, and provider specifying information for specifying a provider who provides a commercial transaction target, per partial area;

a transmitting means that transmits the display data including the advertisement display area to the terminal device;

a position information acquiring means that acquires position information specified in the advertisement display area, from the terminal device;

a partial area specifying means that specifies the partial area including the acquired position information; and a control means that specifies the provider based on partial area specifying information matching the partial area specified by the partial area specifying means, and controls transmission of information matching the specified provider, to the terminal device.

Advantageous Effects of the Invention

The present invention is configured to specify a partial area including a position specified in an advertisement display area of a terminal device, specify a provider based on partial area specifying information matching the partial area and transmit information matching the specified provider, to the terminal device, so that, even when one advertisement display area is shared between a plurality of providers (advertisers), it is possible to increase the probability that the partial area allocated to each provider is specified and efficiently display information matching each provider.

BRIEF EXPLANATION OF THE DRAWINGS

FIG. 2 is a block diagram illustrating a schematic configuration example of an information providing server 3 according to the present embodiment.

FIG. 4 is a view illustrating an example of information registered in a posting information database 323.

FIG. 7 is a view illustrating an example of a table for converting a score calculation element into a conversion point.

FIG. 8 is a flowchart illustrating information providing processing in the system control unit 33 of the information providing server 3.

MODE FOR CARRYING OUT THE INVENTION

Hereinafter, an embodiment of the present invention will be described with reference to the drawings. In addition, the embodiment will be described below where the present invention is applied to an information providing system.

[1. Outline of Configuration and Function of Information Providing System]

First, an outline of a configuration and a function of an information providing system S according to an embodiment of the present invention will be described using FIG. 1.

Figure 1:
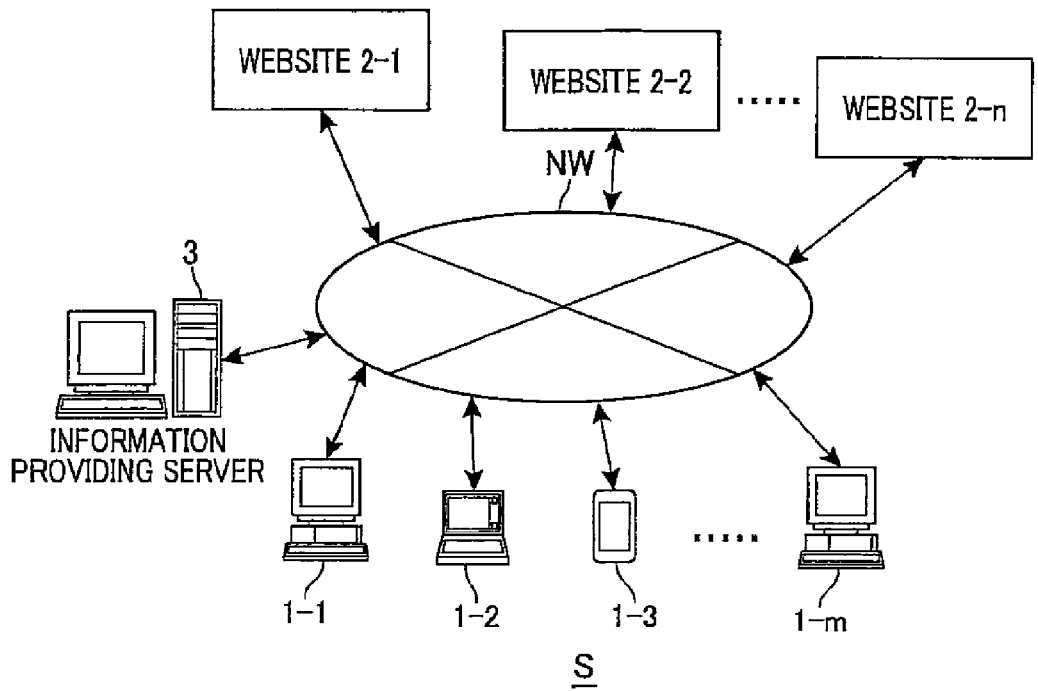
FIG. 1 is a view illustrating an example of a schematic configuration of an information providing system S according to the present embodiment.

FIG. 1 is a view illustrating an example of a schematic configuration of the information providing system S according to the present embodiment.

As illustrated in FIG. 1, the information providing system S has a plurality of user terminals 1-*j* (j=1, 2, . . . m), a plurality of websites 2-*k* (k=1, 2, . . . n) and an information providing server 3 (an example of an information providing device).

The user terminals 1-*j*, the websites 2-*k* and the information providing server 3 can transmit and receive data to and from each other using, for example, TCP/IP for a communication protocol through a network NW. In addition, the network NW is constructed by, for example, the Internet, a dedicated communication line (CATV (Community Antenna Television) line), a mobile communication network (including, for example, base stations) and a gateway.

The user terminal 1-*j* has a web browser function, and acquire a webpage (an example of display data configuring a display screen) by accessing the website 2-*k* or the information providing server 3 through a web browser and display the webpage in a window screen which appears on the display. In addition, as the user terminal 1-*j*, for example, a personal computer (PC), a mobile telephone, a mobile information terminal (PDA: Personal Digital Assistants), a mobile terminal (Smartphone) which combines the mobile telephone and the mobile information terminal and a mobile game machine are applicable. In addition, an operation unit for receiving an operation instruction from a user of the user terminal 1-*j* may be a keyboard, a mouse, a remote controller and a touch panel interface and the like.

The websites 2-*k* is configured by, for example, a web server, an application server and a database server. Such websites 2-*k* is a site in which a webpage displayed on a window screen of the user terminal 1-*j* and posting information posted (inputted or selected on a webpage) by a user (poster) through the webpage are registered. Such website 2-*k* includes a blog site, an SNS (Social Networking Service) site (a community sites), a mini blog site (TWITTER (registered trademark) site), a review site, a word-of-mouth site, a product merchandising site (shopping site), a travel reservation sits, an accommodation reservation site, and a facility use reservation site Note that URL (Uniform Resource Locator) of each site is different from each other.

Meanwhile, posting information includes, for example, information such as an article, a comment, a word, a tweet, a word of mouth, a review and an evaluation (point) on a commercial transaction target. The commercial transaction target is a commercial transaction target such as a product or service (service such as a trip, an accommodation, beauty or a play facility). In addition, a product will be mainly used as an example and described below.

An article, a comment, a word, a tweet, a word of mouth and a review which are examples of posting information are generally character strings inputted when, for example, the user operates an operation key, and is accompanied by an image in some cases. Further, an evaluation is generally a point selected by the user by operating the mouse (or performing a tapping operation on the touch panel) from points classified into a plurality of (for example, 5) levels. Furthermore, when posting information is a word of mouth or a review registered in, for example, a review site, a word-of-mouth site or a product merchandising site, information such as the number of views of the words of mouth of other users or a review is included in the posting information. Still further, when posting information is an article registered in a blog site, the posting information includes information such as the number of other users' views of the article, the number of the other users' replies (the number of other users' comments) to the article, the number of in-bound links (the number of links) (determined by a known referrer) to the article by the other users and the number of in-bound trackbacks (the number of trackbacks) to the article by the other users. Moreover, when posting information is a tweet registered in a mini blog, the posting information includes information such as the number of other users' views of the tweet, the number of followers of the tweet, the number of retweets of the tweet and the number of in-bound links to the tweet by the other users. In addition, the number of followers is the number of other users (followers) who are following (the tweet is automatically sent to the followers). Further, the number of retweets is the number of times of the tweet cited and posted by the other users. In addition, posting information may include the number of transferred customers (a customer transfer source user is decided by, for example, a query string) from, for example, a mail magazine distributed to multiple users. The above posting information is acquired by the information providing server 3.

Next, the information providing server 3 is formed with one or a plurality of server computers which each have a function of, for example, a web server, an application server and a database server) to configure an information providing site. This information providing site may be a blog site, an SNS site, a mini blog site, a review site, a word-of-mouth site, a product merchandising site (shopping site), a trip reservation site, an accommodation reservation site or a facility use reservation site. Further, for example, this information providing site may be included in a website 2-1 among the websites 2-*k* or may be a website associated with the website 2-1 (for example, run by the same service provider).

FIG. 2 is a block diagram illustrating a schematic configuration example of the information providing server 3 according to the present embodiment.

As illustrated in FIG. 2, the information providing server 3 has, for example, a communication unit 31, a memory unit 32 and a system control unit 33.

The communication unit 31 connects to the network NW to control a communication state between the user terminals 1-*j* and the websites 2-*k*.

The memory unit 32 is configured to include, for example, a hard disk drive, and stores an operating system and an application program (including, for example, an information providing program according to the present invention). In addition, the information providing program according to the present invention may be downloaded from, for example, another server through the network NW, or may be recorded in a recording medium such as a CD-ROM and read through a drive.

Further, in the memory unit 32, a structured document (for example, HTML (Hyper Text Markup Language) document or XHTML document) file configuring a webpage (an example of screen data including an advertisement display area) for displaying various items of content, and an image file are stored. Each content arranged in a webpage is configured by, for example, at least one of a text, a still image and a movie. Further, the items of content include various items of content such as an original content (for example, content including a search result in the Internet market) which users desire, and advertisement content (referred to as "advertisement content" below) such as a banner. A size and an arrangement position of each content in a webpage are defined in the above structured document.

Further, with the present embodiment, a product which is an advertisement display target as advertisement content is dynamically determined based on the above posting information as described below. Furthermore, in the advertisement display area of a webpage which displays advertisement content, link information to an information providing site is set.

Further, in the memory unit 32, for example, a store information database (DB) 321, a posting information database (DB) 322, a partial area information database 323 (an example of a partial area information memory means) and a usage requesting store information database (DB) 324 are constructed.

FIG. 3 is a view illustrating a configuration example of information registered in each database.

Figure 3A:
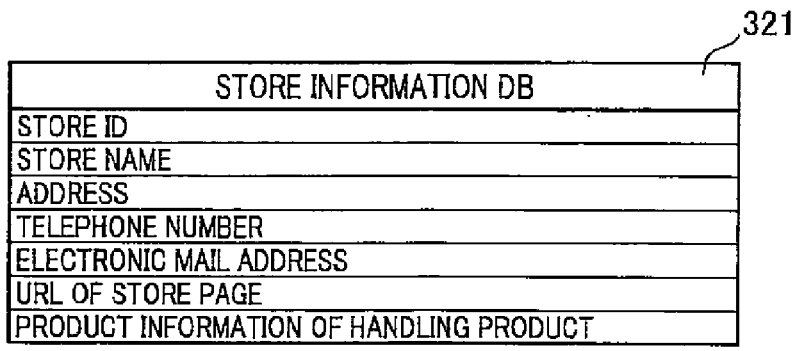
FIGS. 3A to 3D are views illustrating configuration examples of information registered in each database.

In the store information database 321 illustrated in FIG. 3A, store information such as a store ID of a store listed and registered in the Internet market provided from the information providing server 3, a store name, an address, a telephone number, an electronic mail address, a URL of a store page, and product information of handling products is associated per store and registered. Meanwhile, the store ID is an example of provider source specifying information for specifying a store which is a provider who provides a product. The product information of a handling product includes, for example, a product ID of each product sold at a store, a product name, a product code (for example, a JAN code), product description (for example, a product specification and product features), product image data, sales price information, and stock information.

Figure 3B:
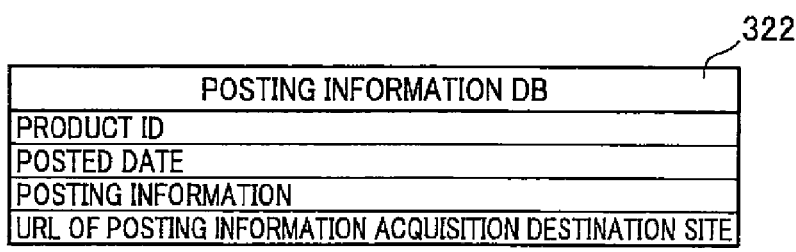

In the posting information database 322 illustrated in FIG. 3B, information such as a product ID of each product, a posted date, posting information, and a URL of the posting information acquisition destination site (website 2-*k*) is associated and registered. FIG. 4 is a view illustrating an example of information registered in the posting information database 322. With an example illustrated in FIG. 4, a plurality of records (1 record=1 row with an example in FIG. 4) are registered for one product (for example, a product ID is "S00001"). It is possible to calculate the number of posts per product by counting the number of records. Further, posting information illustrated in FIG. 4 includes information such as an article, a tweet, a word of mouth, a review, an evaluation and the number of views, and, in addition, a posted date (a posted date and time with this example).

Figure 3C:
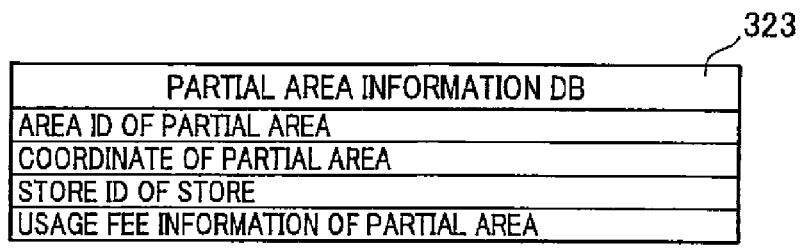

In the partial area information database 323 illustrated in FIG. 3C, an area ID of a partial area, coordinate information of the partial area, a store ID of a store allocated to the partial area and usage fee information of the partial area are associated per partial area and registered.

Figure 5A:
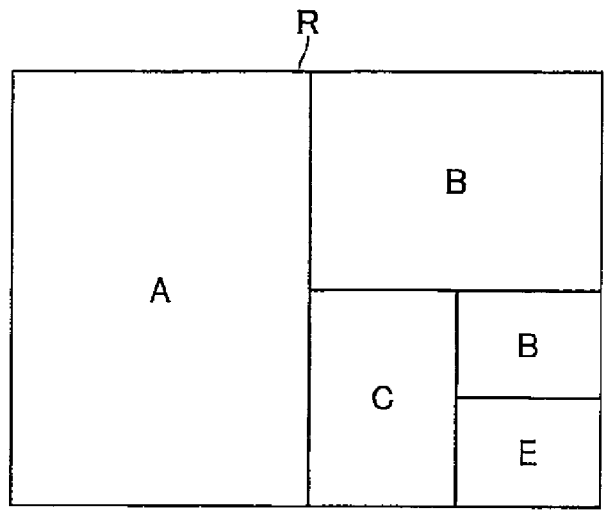
FIGS. 5A and 5B are views illustrating examples of a partial area included in a given advertisement display area.
Figure 5B:
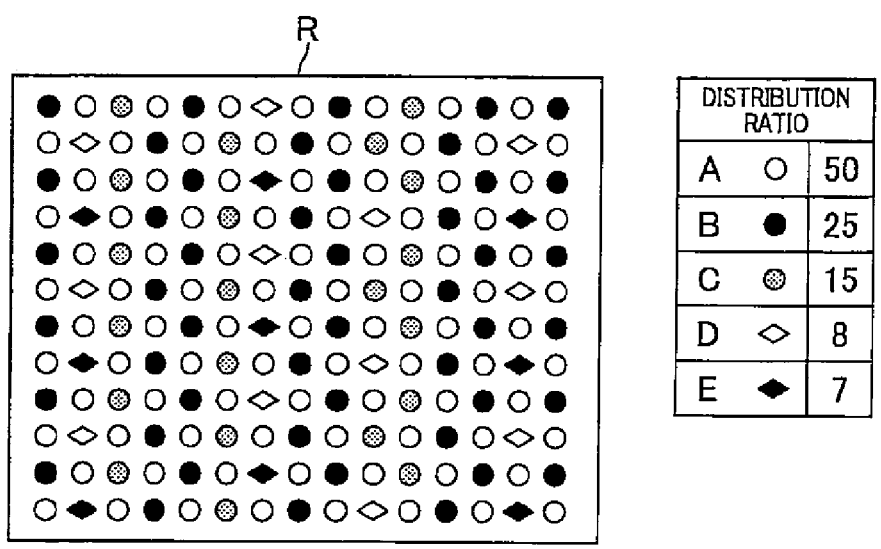

Meanwhile, the partial area refers to part of an area in an advertisement display area of a webpage which displays advertisement content. That is, an advertisement display area includes a plurality of partial areas. FIGS. 5A and 5B are views respectively illustrating an example of a partial area included in a given advertisement display area. With an example illustrated in FIG. 5A, each partial area is formed with each rectangular area (A to E) obtained by dividing an advertisement display area R into rectangular shapes, and the size of each partial area A to E (an area of a rectangular area) is different. In addition, the size of at least two or more partial areas among the partial areas may be the same. Further, the shapes of the partial areas are not limited in particular, and may be triangular, pentagonal or circular. Furthermore, the number of partial areas (five with an example in FIG. 5B) is not limited in particular, and may be any number.

Meanwhile, with the example illustrated in FIG. 5B, each partial area is formed with a set of dot areas of a plurality of pixel units (for example, four pixel units), and a distribution ratio of dot areas (the ratio the dot areas occupy in the advertisement display area R) varies per partial area. For example, dot areas in a partial area A illustrated in FIG. 5 are indicated by symbols o, and these dot areas are scattered in the advertisement display area R at 50% of the distribution ratio. Further, although the size of each partial area A to E (the total sum of areas of massing dot areas) is different, the size of at least two or more partial areas among the partial areas may be the same. Furthermore, the number of partial areas (five with an example in FIG. 5B) is not limited in particular, and may be any number. In addition, with the example illustrated in FIG. 5B, although there is a gap between dot areas, dot areas are actually provided without a gap.

Further, the area ID of a partial area is identification information which varies per partial area, and the area ID of each partial area includes an area ID of an advertisement display area. When the area ID of the advertisement display area is "x0001", area IDs of respective partial areas included in the advertisement display area are represented as "x0001-1", "x0001-2", "x0001-3" and . . . .

Further, coordinate information of a partial area is an example of partial area specifying information for specifying a partial area. When, for example, a partial area is a rectangular area, a pair of coordinates (x, y) at two points of opposing corners in the rectangular area (or a plurality of coordinates on an outline of the partial area) can be coordinate information of the partial area. Further, when a partial area is a set of dot areas, the coordinates of each area (the coordinates of each pixel) can be coordinates of the partial area.

Furthermore, different stores are allocated to respective partial areas by partial area allocation processing described below, and a store ID of the allocated store is associated with an area ID of a partial area, and registered.

Still further, usage fee information of the partial area indicates a usage fee (for example, a usage fee for one month) set to the partial area. Based on this usage fee information, billing processing with respect to stores is performed. This usage fee varies per partial area, and, when, for example, the size of a partial area is larger, a higher usage fee is set. Further, the usage fee may be configured to be set according to the position of the partial area in the advertisement display area (for example, the usage fee is higher at a position which is more likely to be specified by a user). Furthermore, the usage fee may be a fixed fee determined in advance by, for example, users who start webpages or operators of sites, or a variable fee which varies according to a bid presented by each store which desires to utilize se an advertisement display area.

Figure 3D:
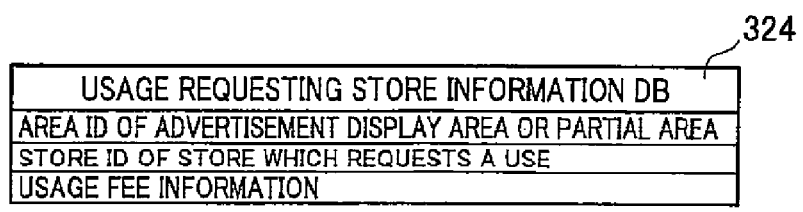

In the usage requesting store information database 324 illustrated in FIG. 3D, for example, an area ID of an advertisement display area or a partial area, a store ID of a store which requests a use of the area and usage fee information are associated and registered. When, for example, the usage fee of the partial area is a fixed fee (the amount of cost at a store side), the store ID of each store which requests a use of the area and usage fee information indicating the fixed fee are associated with the area ID of the partial area and registered. Further, when the usage fee of the partial area is a variable fee, the store ID of each store which requests a use of the area and usage fee information indicating a variable fee (for example, a bid) are associated with the area ID of the advertisement display area or the area ID of the partial area, and registered. From stores registered in this way, a store allocated to a partial area is determined per partial area.

The system control unit 33 has, for example, a CPU (Central Processing Unit), a ROM (Read Only Memory) and a RAM (Random Access Memory). Further, when the CPU reads and executes various programs stored in the ROM or the memory unit, the system control unit 33 functions as, for example, a transmitting means, a position information acquiring means, a partial area specifying means, a control means, an area allocating means and an allocation changing means according to the present invention, and performs processing which will be described below.

[2. Operation of Information Providing System S]

Next, an operation of the information providing system S according to the present embodiment will be described.

(2.1 Operation of Accepting Applications of Stores which Desire to Use Advertisement Display Area)

First, an operation of accepting applications of stores which desire to use an advertisement display area through, for example, an information providing site will be described.

According to an application accepting operation in case that the usage fee is the fixed fee, after logging in an information providing site using, for example, a store ID inputted at a terminal of a store, a webpage which displays, for example, each partial area set in the advertisement display area in advance and information indicating the usage fee set to each partial area is transmitted to the terminal of the store, and is displayed by a web browser. On the webpage displayed in this way, each partial area is visually checked as illustrated in, for example, FIG. 5A or 5B. Further, when an administrator of a store selects a partial area which is requested to use (for example, by checking a radio button) and specifies an application button (for example, by a clicking operation using a mouse or a tapping operation on a touch panel by the finger), information indicating the selected partial area is transmitted from the terminal of the store to the information providing server 3, and the store ID of the store is associated with the area ID of the selected partial area and usage fee information indicating the fixed fee and registered in the usage requesting store information database 324.

Meanwhile, according to an application accepting operation in case that the usage fee is the variable fee (example 1), after logging in an information providing site using, for example, a store ID inputted at a terminal of a store, a webpage which displays, for example, information indicating each partial area set in advance in the advertisement display area and an entry field of a bid is transmitted to the terminal of the store, and is displayed by a web browser. In addition, a configuration may be employed where only the amount of money which can be inputted in the entry field is the currently highest bid or more as in an Internet auction. Further, when an administrator of a store selects a partial area which is requested to use, inputs the input amount of money in the entry field and specifies the application button, the selected partial area and information indicating the inputted bid are transmitted from the terminal of the store to the information providing server 3, and the store ID of the store and usage fee information indicating the inputted bid are associated with the area ID of the selected partial area and registered in the usage requesting store information database 324.

Meanwhile, according to an application accepting operation in case that the usage fee is the variable fee (example 2), after logging in an information providing site using, for example, a store ID inputted at a terminal of a store, a webpage which displays, for example, information indicating the advertisement display area and an entry field of a bid is transmitted to the terminal of the store, and is displayed by a web browser. Further, when an administrator of a store inputs the input amount of money in the entry field and specifies the application button, usage fee information indicating the inputted bid is transmitted from the terminal of the store to the information providing server 3, and the store ID of the store and the inputted bid are associated with the area ID of the advertisement display area and registered in the usage requesting store information database 324.

(2.2. Operation of Setting Advertisement Content)

First, an operation of setting advertisement content will be described using FIG. 6.

Figure 6:
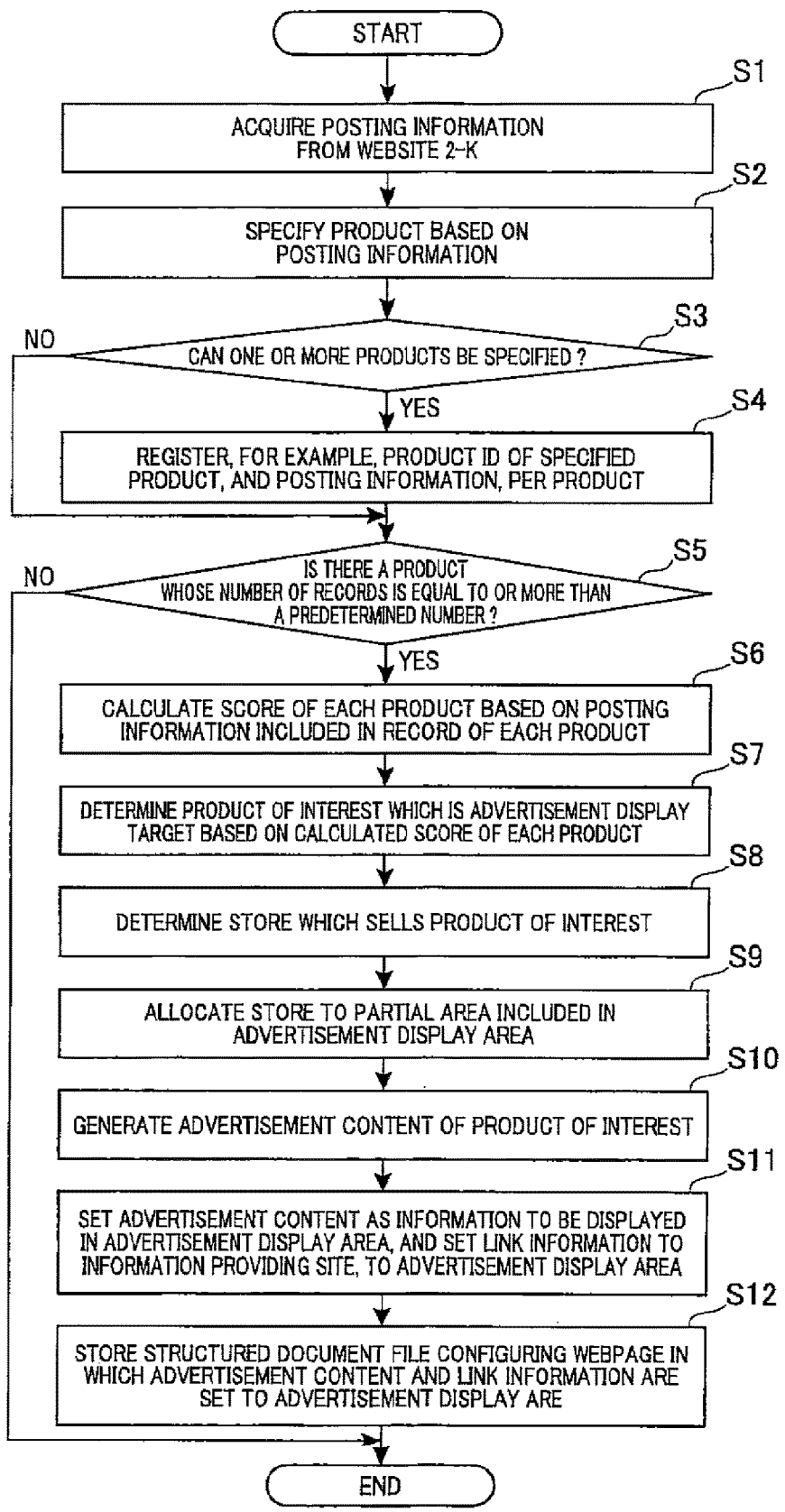
FIG. 6 is a flowchart illustrating processing of setting advertisement content in a system control unit 33 of the information providing server 3.

FIG. 6 is a flowchart illustrating processing of setting advertisement content in the system control unit 33 of the information providing server 3. This advertisement content setting processing is started when, for example, an instruction is received from an operator, the number of posts or the number of views which is monitored exceeds a threshold or a request for a webpage is received from the user terminal 1-$j$ which accessed an information providing site. Further, a configuration may be employed where this advertisement content setting processing is started per predetermined time (for example, every 48 hour) according to a set time (or a set timer).

When processing illustrated in FIG. 6 is started, the system control unit 33 acquires posting information registered in the website 2-$k$ (step S1). For example, the system control unit 33 sets in advance URLs of one or more websites 2-$k$ which are acquisition destinations of posting information, accesses the websites 2-$k$ according to the URLs and acquires posting information from web servers of the websites 2-$k$.

As described above, posting information including, for example, an article, a comment, a tweet, a word of mouth, a review or an evaluation is acquired from, for example, a blog site, a mini blog site, a review site, a word of mouth site and a product selling site.

Next, the system control unit 33 performs processing of specifying a product from, for example, the store information database 321 based on the acquired posting information (step S2). When, for example, a product name or a product code is extracted from a character string related to the posting information, and the extracted product name or product code is registered in the store information database 321 (that is, included in product information of a handling product), a product (product ID) associated with the product name or the product code is specified. Alternatively, in case of a webpage in which a user inputs, for example, a review of a product set in advance in an entry field, if a product name or a product code described in association with the entry field of the webpage is extracted, and the extracted product name or product code is registered in the store information database 321, a product (product ID) associated with the product name or the product code is specified. In addition, a product may be specified by referring to a database (for example, a database in which information about an unreleased product is registered) other than the store information database 321.

Next, the system control unit 33 decides whether or not one or more products are specified in above step S2 (step S3). Further, when specifying one or more products (YES in step S3), the system control unit 33 associates information such as a product ID of the specified product, posting information and a URL of an acquisition destination site of the posting information per product (per record) to register in the posting information database 322 (step S4), and proceeds to step S5. Meanwhile, when a product ID, a posted date and a character string included in a newly registered record, and a product ID, a posted date and a character string included in a record already registered in the posting information database 322 are identical, the record which is already registered is updated (for example, overwritten) with the new record (in this case, updated when, for example, the number of views included in the record changes). Meanwhile, when even one product cannot be specified (NO in step S3), the system control unit 33 proceeds to step S5 as is.

Next, in step S5, the system control unit 33 refers to the posting information database 322, extracts a record of a product of which posted date is in a period between a current point of time and a point of time which is a predetermined period in the past (for example, one week before) (for example, a product for which posting information was posted within recent one week), and decides whether or not there is a product the number of extracted records of which is a predetermined number (for example, 10) or more. Further, the system control unit 33 proceeds to step S6 when deciding that there is a product the number of extracted records of which is a predetermined number or more (YES in step S5), and finishes processing illustrated in FIG. 6 when determining that there is not a product the number of extracted records of which is a predetermined number or more (NO in step S5). This step S5 enables a product which recently is gaining attention of users to some degree to be extracted. When, for example, the number of records of a product α is 100 in total, and the number of records the posted dates of which are within a period T is ten (which satisfies conditions that the number of records is the predetermined number or more), ten records of this product α are extracted and used in processing subsequent to step S6 (in other words, records posted in the past prior to this period T are excluded from the extraction). Meanwhile, when, for example, the number of records of the product α is 100 in total and the number of records the posted dates of which are within the period T is nine (which does not satisfy the conditions that the number of records is the predetermined number or more), the records of this product α are not used in the processing illustrated in FIG. 6. In addition, a configuration may be employed where, in processing of this step S5, all records registered in the posting information database 322 in the past are extracted irrespectively of a period between the current point of time and a point of time which is a predetermined time before in the past.

Next, in step S6, the system control unit 33 calculates a score as the degree of attention of each product based on posting information included in the extracted record of each product per product (product ID) the number of records of which is the predetermined number or more. Methods of calculating this score include, for example, following (a) to (d).

In addition, in calculation of this score, the number of posts about a product, the number of views, the number of replies, the number of in-bound links, the number of in-bound trackbacks, the number of followers and the number of retweets are referred to as "score calculation elements", respectively. When the numbers indicated in these score calculation elements are greater, it may be said that a product is gaining attention. Meanwhile, the number of posts on a product is obtained by counting the number of extracted records of the product per product. For example, the number of posts on a product of a product ID "S00001" illustrated in FIG. 4 is the number of records including the product ID. Further, the number of replies to the product is obtained by summing up the number of replies included in each extracted record of the product per product. For example, the number of replies to the product of the product ID "S00001" illustrated in FIG. 4 is the sum of each number of replies included in each record including the product ID (the same also applies to the number of in-bound links, the number of in-bound trackbacks, the number of followers and the number of retweets).

(a) Calculation Method Using Score Calculation Element

In this case, the system control unit 33 calculates as a score one score calculation element selected in advance (for example, one element of the number of posts, the number of views, the number of replies, the number of in-bound links and the number of followers) or the sum of a plurality of selected score calculation elements (for example, the sum of the number of posts and the number of views. The sum of other two or more elements may be used). Alternatively, each of a plurality of score calculation elements selected in advance may be calculated as a score (in this case, for example, the number of posts is a first score, and the number of views is a second score). Meanwhile, although any score calculation element may be selected, some elements cannot be obtained depending on a type of posting information (a type such as an article, a comment, a word, a tweet, a word of mouth, a review or an evaluation), and therefore the number of posts or the number of views which can be obtained from any type is desirably selected. According to the calculating method (a), it is possible to quickly calculate a score. By the way, when a celebrity is a poster, the number of followers of this poster (the number of users following this poster) is up to several thousands or tens of thousands. Hence, when the number of followers or the sum of each score calculation element including the number of followers is calculated as a score, a score (the degree of attention) of a product for which the celebrity is the poster rises instantly. As described above, a method of calculating a score using the number of followers is effective to give a varying inflation per poster, so that it is possible to increase a score of a product which is highly likely to gain attention from a lot of people in the future (that is, a celebrity is paying attention to the product and so other people are also highly likely to pay attention to the product) (as a result, the product is easily determined as a product of interest in step S7 described below).

In addition, according to a configuration where, for example, a greater weighting coefficient (for example, 2) than those of other score calculation elements is multiplied on a score calculation element of, for example, the number of views obtained based on posting information acquired from a popular blog page at a higher rank in an access ranking or a blog page of a blogger set in advance (a weighting coefficient "1" is multiplied on a score calculation element obtained based on posting information acquired from a normal webpage), and the sum of score calculation elements is calculated, it is possible to calculate a precise score. Further, according to a configuration where, for example, a greater weighting coefficient (for example, 2) than those of other records is multiplied on a record including posting information acquired from a popular blog page at a higher rank in an access ranking or a blog page of a blogger set in advance, and records are counted (that is, the record multiplied with the greater weighting coefficient than those of the other records is counted twice instead of being counted once), it is possible to calculate a high score for the number of posts.

(b) Calculation Method Using Conversion Point of Score Calculation Element

In this case, the system control unit 33 calculates as a score the sum of conversion points of each of a plurality of selected score calculation elements. FIG. 7 is a view illustrating an example of a table for converting a score calculation element into a conversion point. As illustrated in FIG. 7, the number of hits required to obtain the same conversion point is different per score calculation element. To obtain 20 p (points), for example, "1001 to 2000 hits" is required for the number of posts, and "21 to 40 hits" is required for the number of in-bound links. The system control unit 33 converts each selected score calculation element into a conversion point referring to the conversion table stored in, for example, the RAM, and calculates the sum of the converted conversion points as the score. According to the calculating method (b), a score is calculated by taking into account a contribution rate (weight) of each score calculation element to the degree of attention to a product, so that it is possible to calculate a precise score.

In addition, according to a configuration where, for example, a greater weighting coefficient (for example, 2) than those of other conversion points is multiplied on a conversion point obtained based on posting information acquired from a popular blog page at a higher rank in an access ranking or a blog page of a blogger set in advance (a weighting coefficient "1" is multiplied on the conversion point obtained based on posting information acquired from a normal webpage), and the sum of each conversion point is calculated, it is possible to calculate a more precise score.

(c) Calculation Method Using Content of Posting Information

In this case, the system control unit 33 calculates as a score the sum of evaluation points obtained based on at least one of an evaluation (point) and a character string (an example of information related to an evaluation on a commercial transaction target) included in posting information. In case of an evaluation, a point which reflects the evaluation as is or a point which is obtained by multiplying a point with a predetermined coefficient is obtained as an evaluation point. Meanwhile, in case of a character string, when a word (or sentence) registered in a predetermined word list is included in the character string, an evaluation point matching the word is obtained from the word list. In this word list, for example, positive words and negative words are registered, and, while a plus evaluation point is associated with the positive words, a minus evaluation point is associated with the negative words. For example, examples of positive words and evaluations points are "operability is good→evaluation point: +2", "very satisfied→evaluation point: +3", and "recommendable . . . →evaluation point: +3", and evaluation points associated per word are different (the same also applies to a sentence). Meanwhile, examples of negative words and evaluation points are "price is high→evaluation point: −1", "few functions→evaluation point: −1" and "not so good→evaluation point: −2", and evaluation points associated per word are different. In addition, posting information is expressed by various people, and some words are positive and negative depending on connection (modification relation) of preceding and subsequent words. For example, while "not good" in a sentence "sound quality is not good" is evaluated as negative words, "good, isn't it?" in a sentence "sound quality is good, isn't it?" can be evaluated as positive words in some cases because "?" is added. Hence, it is more effective to employ a configuration of performing polar characteristic discrimination as to negative or positive to be learned, and sorting words registered in the word list to positive and negative (that is, the polar characters of words registered in the word list are not fixed and are allowed to fluctuate according to learning). In addition, a known technique is applicable to the above polar characteristic discrimination and therefore will not be described. Further, the system control unit 33 divides a character string included in posting information of a record into a word of a predetermined length (for example, a morpheme (a minimum unit of a language having a meaning)) by, for example, morpheme analysis, checks whether or not the word or a combination of words is registered in the word list and, when the word or the combination is registered, obtains a corresponding evaluation point from the word list (extracts per extracted record). In addition, when a plurality of words registered in the word list are included in a character string included in posting information in one record, the sum of evaluation points matching each word (further, when an evaluation is also included in posting information, a point matching the evaluation is added) is obtained as an evaluation point matching the record. Further, when no word registered in the word list is included in a character string included in posting information in one record, the evaluation point matching the record is "0". Furthermore, the system control unit 33 calculates a score by summing an evaluation point matching each record per product. According to the calculating method (c), the score is calculated by taking into account, for example, an opinion or a feeling on a product of a poster, so that it is possible to calculate a more precise score.

In addition, according to a configuration where, for example, a greater weighting coefficient (for example, 2) than those of the other evaluation points is multiplied on an evaluation point obtained based on posting information acquired from a popular blog page at a higher rank of an access ranking or a blog page of a blogger set in advance (a weighting coefficient "1" is multiplied on an evaluation point obtained based on posting information acquired from a normal webpage), it is possible to calculate a more precise score.

(d) Calculation Method Using Growth rate in Score Calculation Element

In this case, the system control unit 33 calculates as a score a growth rate of one score calculation element selected in advance in a predetermined period (for example, five days) or the sum of a plurality of growth rates selected in advance in a predetermined period. Meanwhile, the growth rate is calculated (by multiplying with 100 a value obtained by dividing by the number of posts on the first day of the predetermined period the number of posts on the final day) %. According to the calculating method (d), the score is calculated taking into account the growth rate of, for example, the number of posts, so that it is possible to calculate a more precise score.

In addition, a configuration may be employed where the sum of scores obtained according to one of a plurality of above calculating methods (a) to (d) (for example, the calculating method (a) and the calculating method (c) are desirable) is calculated as the final score to obtain a more precise score. In this case, by multiplying the score obtained according to each calculating method by a weighting coefficient matching the degree of importance and calculating as the final score the sum of the scores, it is possible to obtain a more precise score. In addition, a configuration may be employed where scores are calculated according to a calculating method other than the above calculating methods (a) to (d).

After the score is calculated as described above, the system control unit 33 determines (determines using a product ID) a product (referred to as "product of interest" below) which is an advertisement display target, based on the calculated score of each product (step S7). For example, the system control unit 33 compares the score of each product, and determines the product of the highest score as the product of interest.

Meanwhile, when the score of each selected score calculation element (for example, the first score or the second score) is calculated according to the calculating method (b), the system control unit 33 determines a ranking per score of each score calculation element, then calculates the sum (or an average) of respective rank orders in the ranking per product, compares the sums of the rank orders, and determines the product of the smallest sum of the rank orders as the product of interest. When, for example, the rank order of the score of the number of posts with respect to a product of the product ID "S00001" is the first rank and the rank order of the score of the number of views is the third rank, the sum of rank orders is "4" (the average is 2).

In addition, the product ID of the determined product of interest and the score of the product of interest are associated and stored in, for example, the RAM.

Next, the system control unit 33 determines (determines using a store ID) a store which sells the product of interest determined in above step S7 (step S8). For example, the system control unit 33 refers to the store information database 321, and determines a store matching store information including the product ID of the product of interest. Alternatively, the system control unit 33 may determine a store which includes a product ID of the product of interest and has a stock of the product of interest.

Next, the system control unit 33 performs processing (referred to as "partial area allocation processing" below) of allocating (associating) a store to a partial area included in the advertisement display area set in advance (step S9). According to partial area allocation processing in case that the usage fee is the fixed fee, the system control unit 33 specifies a store ID of the store determined in above step S8 among store IDs associated with the area IDs of the partial areas registered in the usage requesting store information database 324. Further, when there is one specified store ID, the system control unit 33 allocates a store associated with the store ID to the partial area. Meanwhile, when there is a plurality of specified store IDs, the system control unit 33 selects one store ID at random from these store IDs (alternatively, selects a store ID of a store which sells the determined product of interest at the lowest price), and allocates the store associated with the selected store ID to the partial area. Further, the system control unit 33 registers the store ID of the store allocated to the partial area, in the partial area information database 323 in association with the area ID of the partial area (registers the area ID of the partial area, coordinate information and usage fee information in advance). Stores are allocated and registered in this way per partial area.

Meanwhile, according to partial area allocation processing (example 1) in case that the usage fee is the variable fee, the system control unit 33 specifies the store ID of the store determined in above step S8 among the store IDs associated with the area IDs of the partial areas registered in the usage requesting store information database 324. Further, when there is one specified store ID, the system control unit 33 allocates a store associated with the store ID to the partial area. Meanwhile, when there is a plurality of specified store IDs, the system control unit 33 selects the store ID of the highest bid among the specified store IDs, and allocates the stored associated with the selected store ID, to the partial area. Further, the system control unit 33 registers the store ID of the store allocated to the partial area, in the partial area information database 323 in association with the area ID of the partial area (registers the area ID of the partial area, and coordinate information in advance), and registers the bid of the store allocated to the partial area as usage fee information of the partial area, in the partial area information database 323 in association with the area ID of the partial area. Stores are allocated and registered in this way per partial area.

Meanwhile, according to partial area allocation processing (example 2) in case that the usage fee is the variable fee, the system control unit 33 specifies the store ID of the store determined in above step S8 among the store IDs associated with the area IDs of the advertisement area registered in the usage requesting store information database 324 (a precondition is that a plurality of store IDs are specified). Further, the system control unit 33 compares the bid associated with each specified store ID, sorts the bid in order from the highest bid, determines the bid ranking and determines stores from the first rank (the highest bid) to a predetermined rank order (for example, a rank order corresponding to the number of partial areas determined in advance) in the ranking. When, for example, the number of partial areas is five as illustrated in FIG. 5A or FIG. 5B, the predetermined rank order is the fifth rank. Further, the system control unit 33 allocates each store to each partial area based on the bid of each determined store (the rank order of the bid). For example, a store of a higher bid is allocated a partial area of a larger size (or a higher distribution ratio of dot areas). Further, for example, a store of a higher bid is allocated a partial area including, for example, a position which is likely to be specified by a viewer (for example, a clicking operation using the mouse or the tapping operation on the touch panel). Meanwhile, the position which is likely to be specified by the viewer corresponds to a position of a higher specifying count in, for example, a past record. The specifying count of each partial area (for example, the total sum of the number of times of clicking and the number of times of tapping) is associated with the area ID of each partial area and registered in the specifying count table (an example of a specifying count memory means), and the specifying count registered every time the partial area is specified is incremented. Hence, by referring to the specifying count, it is possible to specify the partial area including the position of a higher specifying count in the past record. That is, the system control unit 33 compares the specifying count of each partial area registered in the specifying count table, and allocates a store of a relatively higher bid (for example, an upper rank (the first rank) in the bid ranking) of the usage fee, to the partial area of a relatively higher specifying count (for example, a higher rank (the first rank) in the specifying count ranking). Further, another example of the position which is likely to be specified by the viewer corresponds to the position at which information for leading the viewer to specify the position is displayed. The information for leading the viewer to specify the position is, for example, an image such as letters of "click here" or an arrow, or a combination of a speech balloon and characters. The position at which such display is provided is highly likely to be specified by the viewer unconsciously. Further, the system control unit 33 registers the store ID of the store allocated to each partial area in the partial area information database 323 in association with the area ID of each partial area, and registers the bid of the store allocated to each partial area in the partial area information database 323 in association with the area ID of each partial area as usage fee information of each partial area.

In addition, a configuration may be employed in the partial area allocation processing (example 2) in case that the usage fee is the variable fee where the partial area is determined based on the bid of each determined store (that is, the number and the size of partial areas (or the distribution ratio of dot areas) are determined). In this case, the system control unit 33 determines stores from the first rank to the predetermined rank order based on the number of specified store IDs in the determined bid ranking order. When, for example, the number of specified store IDs is a predetermined number (for example, five) or more, the stores at the first rank to the rank order which corresponds to a predetermined number (for example, the fifth rank) are determined, and, when the number of the specified store IDs is a predetermined number or less (for example, three), stores at the first rank to a rank order (for example, the third rank) corresponding to the number of specified store IDs are determined. Further, the system control unit 33 calculates the total sum of bids of the determined stores, and calculates per determined store a ratio (occupancy) (%) of a bid in the calculated total sum. Furthermore, the system control unit 33 determines each partial area based on the calculated ratio of each bid. In other words, the size of the partial area (illustrated in FIG. 5A) or the distribution ratio of dot areas of each partial area (illustrated in FIG. 5B) is determined. When, for example, the ratio of the bid is 50%, half of the advertisement display area is determined as partial areas. Alternatively, when the ratio of the bid is 50%, the distribution ratio of dot areas of the partial area is determined as 50%. Further, the system control unit 33 allocates to the partial area the store (the determined store) associated with the bid (ratio) used to determine the partial area.

Next, the system control unit 33 generates advertisement content of the product of interest determined in above step S7 (step S10). For example, at least one of product image data and text data of product description included in product information of one store (for example, the store of the highest bid) of the stores to which the partial areas are allocated is extracted from the store information database 321, and advertisement content (for example, advertisement including an image of the same size as the advertisement display area) based on the extracted data is generated.

Next, the system control unit 33 sets the generated advertisement content (banner advertisement: 1001.gif) as information to be displayed in the advertisement display area including each partial area to which the store is allocated, and sets link information (for example, a URL of the information providing site) to the information providing site, to the advertisement display area (step S11). In addition, the URL of this information providing site includes the area ID of the advertisement display area in which the advertisement content is set. For example, link information is generated as "<A href="http://www.abc.com/?id=x0001/cgi . . . /" target=#'blank'><IMG src="http://www.abc.com/banner/1001.gif"></A>". The above link information may be an affiliate link. When purchase settlement is performed for a product through the affiliate link, affiliate result reward is paid to a poster associated with posting information about the product.

Next, the system control unit 33 stores, for example, a structured document file configuring a webpage in which the advertisement content and the link information are set to the advertisement display area, in a memory area indicated by an accessible URL from the user terminal 1-$j$ (step S12). By this means, when a given user terminal 1-$j$ subsequently requests for a webpage, the system control unit 33 transmits the webpage in which, for example, the advertisement content is set to the advertisement display area, to the user terminal 1-$j$ which made the request. In addition, when the processing illustrated in FIG. 6 is started upon reception of a request for a webpage from the user terminal 1-$j$, the system control unit 33 transmits the webpage in which, for example, the advertisement content is set to the advertisement display area, to the user terminal 1-$j$, which made the request, to display.

According to the above advertisement content setting processing, it is possible to determine as an advertisement display target set to the advertisement display area a product which is recently gaining attention or is likely to gain attention among users of the user terminals 1-$j$, so that it is possible to increase the frequency of specifying such an advertisement display area and, consequently, improve the frequency of viewing information matching a store which provides the product. In addition, although the advertisement content setting processing is configured to determine a product of interest which is the advertisement display target based on posting information, a configuration may be employed where, for example, questionnaires about products for which many stores desire to create an advertisement are issued, and a product which is desired the most in the questionnaire result is determined as a product which is the advertisement display target.

(2.3. Operation of Providing Information Matching Store Allocated to Partial Area)

Next, an operation of providing information matching a store allocated to a partial area will be described using FIG. 8.

FIG. 8 is a flowchart illustrating information providing processing in the system control unit 33 of the information providing server 3. In a state where a webpage including the advertisement display area to which the stores are allocated is received by the user terminal 1-$j$ and is displayed on the window screen, an arbitrary position in the advertisement display area (in other words, advertisement content) is specified by a user's operation (for example, a clicking operation using the mouse or the tapping operation on the touch panel), the web browser of the user terminal 1-$j$ transmits to the information providing server 3 a request including position information specified in the advertisement display area (coordinates on the webpage) and the URL of the information providing site. Further, when receiving a request (that is, the information providing server 3 acquires, for example, position information from the user terminal 1-$j$), the system control unit 33 of the information providing server 3 starts the processing illustrated in FIG. 8.

When the processing illustrated in FIG. 8 is started, the system control unit 33 acquires the position information and the area ID of the advertisement display area from the received request (step S21).

Next, the system control unit 33 refers to the partial area information database 323, and specifies the area ID of each partial area included in the advertisement display area based on the acquired area ID of the advertisement display area (step S22).

Next, the system control unit 33 compares coordinate information of each partial area associated with the area ID of each specified partial area and position information acquired in above step S21 to specify the partial area including the position information (coordinate) (step S23). For example, the system control unit 33 finds a coordinate group which defines a range of each partial area from coordinate information of each partial area, and specifies a partial area matching the coordinate group including the position information (coordinates) acquired in above step S21. The specified partial area is a partial area specified by a user's operation.

Next, the system control unit 33 increments by one the specifying count associated with the area ID of the partial area specified in above step S23 among the specifying count of each partial area (for example, the total sum of the number of times of clicking and the number of times of tapping) registered in the specifying count table (an example of a specifying count memory means) stored in association with the area ID of the advertisement display area acquired in above step S21 (step S24). Thus, every time the partial area is specified in above step S23, the specifying count of the specified partial area registered in the specifying count table is incremented. According to the specifying count, it is possible to decide how many times the partial area is specified by the viewer.

Next, the system control unit 33 specifies the store based on the area ID associated with the specified partial area, and controls transmission of information matching the specified store (that is, the store allocated to the partial area) to the user terminal 1-$j$ (step S25). For example, the system control unit 33 acquires the store ID of the store allocated to the specified partial area (that is, the store ID associated with the area ID of the specified partial area), from the partial area information database 323 (by this means, the store is specified). Further, the system control unit 33 acquires, for example, product information associated with the acquired store ID, from the store information database 321, and generates a product purchase procedure page for allowing the store associated with the store ID to perform purchase procedure of the product of interest (the product of interest for which an advertisement is displayed in the advertisement display area) based on, for example, the acquired product information. Furthermore, the system control unit 33 transmits the generated product purchase procedure page (an example of information matching the store) to the user terminal 1-$j$ (the user terminal 1-$j$ which transmitted the request) as information matching the store allocated to the specified partial area, and causes the user terminal 1-$j$ display the information on the web browser.

Alternatively, a configuration may be employed where the system control unit 33 acquires from the store information database 321 a URL (redirect information) of the store page associated with the store ID acquired from the partial area information database 323, and the URL of the acquired store page (an example of information matching the store) is transmitted to the user terminal 1-$j$ as information matching the store allocated to the partial area. In this case, the web browser of the user terminal 1-$j$ accesses the redirect destination (web server) indicated by the URL of the received store page, and acquires and displays the store page.

Alternatively, the system control unit 33 acquires from the store information database 321 the URL of the store page associated with the store ID acquired from the partial area information database 323, accesses a web server indicated by the URL of the store page by means of a function of a proxy server instead of the user terminal, and acquires the store page. Further, a configuration may be employed where the system control unit 33 transmits the acquired store page (an example of information matching the store) to the user terminal 1-$j$ and causes the user terminal 1-$j$ display the store page on the web browser.

In addition, a configuration may be employed with another example of "controlling transmission of information matching a store to the user terminal 1-$j$" in step S25 where the system control unit 33 transmits information matching the store (an electronic mail (addressed to an electronic mail address of the user of the user terminal 1-$j$) in which the store page or information about the store is described), to the user terminal 1-$j$ from another server (an application server or a mail server).

(2.4. Operation of Changing Allocation of Store to Partial Area)

Next, an operation of changing allocation of a store to a partial area will be described.

Allocation change processing related to an operation of changing allocation of a store to this partial area is started by the system control unit 33 when predetermined conditions are satisfied. The predetermined conditions include that, for example, a predetermined time passes or the specifying count of the partial area exceeds the threshold.

For example, the system control unit 33 starts the allocation change processing per predetermined time (for example, every 24 hour) according to the set time (or a set timer), and performs the same processing as in above step S9. In this case, when, for example, the store ID is newly registered in the usage requesting store information database 324 according to an operation of accepting an application of the store between previous partial area allocation processing (or allocation change processing) and current allocation change processing, the newly registered store can also be an allocation candidate.

Alternatively, the system control unit 33 starts allocation change processing per predetermined time (for example, every 24 hours) according to a set time (or a set timer), compares the specifying count of each partial area registered in the specifying count table, sorts the specifying count in order from the highest specifying count and determines the specifying count ranking. Further, the system control unit 33 allocates each store to each partial area (the same partial area as the previous partial area is allocated in some cases) based on the specifying count of each determined partial area (the rank order of the specifying count). For example, a store of a higher bid is allocated a partial area of a higher specifying count. By this means, it is possible to change allocation of the store of the highest bid to a partial area of a higher specifying count which the user actually specifies even when, for example, the size is small.

Alternatively, the system control unit 33 decides whether or not the specifying count exceeds a threshold (for example, fifty times) when the specifying count registered in the specifying count table is incremented by 1 in above step S24, and starts the allocation change processing when the specifying count exceeds the threshold. According to this allocation change processing, the system control unit 33 changes the allocation by switching between a store allocated to the partial area the specifying count of which exceeds the threshold (for example, a partial area A illustrated in FIG. 5A) and a store allocated to another partial area (a partial area B to which the highest usage fee is set other than partial areas the specifying counts of which exceed the threshold). By this means, it is possible to allocate a partial area which is likely to be specified, to a store allocated to a partial area the specifying count of which has not yet reach the threshold.

As described above, according to the embodiment, even when one advertisement display area is shared among a plurality of stores (advertisers), it is possible to allocate different stores (advertisers) per partial area included in one advertisement display area without switching advertisement content displayed in the advertisement display area in a short time. Consequently, it is possible to increase the probability that the partial area allocated to each store is specified by the viewer, and efficiently display information matching each store.

Further, a partial area allocated to a store which pays a little advertisement fee is continuously displayed, so that it is possible to increase the probability that the partial area is specified by the viewer. Furthermore, for example, the size and the distribution ratio of a partial area allocated according to a usage fee (advertisement fee) paid by each store for a product of an advertisement display target are determined, so that it is possible to increase the probability that a partial area to be allocated to a store which pays a high usage fee is specified. Consequently, it is possible to provide a reasonable advertisement display area to each store.

REFERENCE SIGNS LIST 1-j USER TERMINAL
2-k WEBSITE
3 INFORMATION PROVIDING SERVER
31 COMMUNICATION UNIT
31 MEMORY UNIT
33 SYSTEM CONTROL UNIT
321 STORE INFORMATION DATABASE
322 POSTING INFORMATION DATABASE
323 PARTIAL AREA INFORMATION DATABASE
324 USAGE REQUESTING STORE INFORMATION DATABASE
NW NETWORK
S INFORMATION PROVIDING SYSTEM

The invention claimed is:

1. An information providing device that provides display data including an advertisement display area to a terminal device with at least one display through a network, the information providing device comprising:
   at least one memory operable to store program code; and
   at least one processor operable to access said at least one memory and read said program code and operate as instructed by said program code, said program code including:
      transmitting code configured to cause at least one of said at least one processor to transmit display data over the network to the terminal device, the display data comprising one advertisement display area that includes advertisement content comprising an image that is the same size as the advertisement display area, the image showing a single commercial transaction target, wherein
         a plurality of partial areas constitute the image of the advertisement content, each partial area comprising a set of dot areas, and each dot area comprising a plurality of pixel units, and
         each of the plurality of partial areas is allocated to one or more of a plurality of providers providing the single commercial transaction target, and locations of the set of dot areas corresponding to each partial area are randomly distributed in the image of the advertisement content;
      acquiring code configured to cause at least one of said at least one processor to acquire position information including coordinates corresponding to a user input detected within the image of the single commercial transaction target, wherein the detected user input includes at least one of a clicking operation or a tapping operation on a dot area among the plurality of dot areas in the image of the advertisement content;
      selecting code configured to cause at least one of said at least one processor to determine the dot area corresponding to the coordinates included in the acquired position information and select one of the one or more providers to which a partial area corresponding to the determined dot area is allocated; and
      controlling conde configured to cause at least one of said at least one processor to control to transmit information matching the selected one of the plurality of providers to the terminal device.

2. The information providing device according to claim 1, wherein said program code further comprises area allocating code configured to cause at least one of said at least one processor to allocate a partial area to the one or more providers based on a usage fee for utilizing the advertisement display area.

3. The information providing device according to claim 2, wherein said program code further comprises specifying count memory code configured to cause at least one of said at least one processor to store a specifying count of the partial area per partial area,
wherein the area allocating code is further configured to cause at least one of said at least one processor to compare specifying counts of the stored respective partial areas, and allocate a provider of a relatively high bid of the usage fee to a partial area of a relatively high specifying count.

4. The information providing device according to claim 1, wherein said program code further comprises allocation changing code configured to cause at least one of said at least one processor to change a provider allocated to a partial area based on a predetermined condition.

5. The information providing device according to claim 2, wherein said program code further comprises allocation changing code configured to cause at least one of said at least one processor to change a provider allocated to a partial area based on a predetermined condition.

6. The information providing device according to claim 3, wherein said program code further comprises allocation changing code configured to cause at least one of said at least one processor to change a provider allocated to a partial area based on a predetermined condition.

7. The information providing device according to claim 4, wherein said program code further comprises specifying count memory code configured to cause at least one of said at least one processor to store a specifying count of the partial area per partial area,
wherein the allocation changing code is further configured to cause at least one of said at least one processor to change a provider allocated to a partial area whose specifying count exceeds a threshold.

8. The information providing device according to claim 5, wherein said program code further comprises specifying count memory code configured to cause at least one of said at least one processor to store a specifying count of the partial area per partial area,
wherein the allocation changing code is further configured to cause at least one of said at least one processor to change a provider allocated to a partial area whose specifying count exceeds a threshold.

9. The information providing device according to claim 6, wherein said program code further comprises specifying count memory code configured to cause at least one of said at least one processor to store a specifying count of the partial area per partial area,
wherein the allocation changing code is further configured to cause at least one of said at least one processor to change a provider allocated to a partial area whose specifying count exceeds a threshold.

10. An information providing method executed by a computer, the information providing method comprising:
   transmitting display data over a network to a terminal device, the display data comprising an advertisement display area that includes advertisement content comprising an image that is the same size as the advertisement display area, the image showing a single commercial transaction target, wherein
      a plurality of partial areas constitute the image of the advertisement content, each partial area comprising a set of dot areas, and each dot area comprising a plurality of pixel units, and
      each of the plurality of partial areas is allocated to one or more of a plurality of providers providing the single commercial transaction target, and locations of the set of dot areas corresponding to each partial area are randomly distributed in the image of the advertisement content;
   acquiring position information including coordinates corresponding to a user input detected within the image of the single commercial transaction target, wherein the detected user input includes at least one of a clicking operation or a tapping operation on a dot area among the plurality of dot areas in the image of the advertisement content;
   determining the dot area corresponding to the coordinates included in the acquired position information, and selecting one of the one or more providers to which a partial area corresponding to the determined dot area is allocated; and
   controlling to transmit information matching the selected one of the plurality of providers to the terminal device.

\* \* \* \* \*